Sept. 1, 1964          J. W. TOZIER          3,146,732
PROMOTIONAL DISPLAY FRAME
Filed May 7, 1962
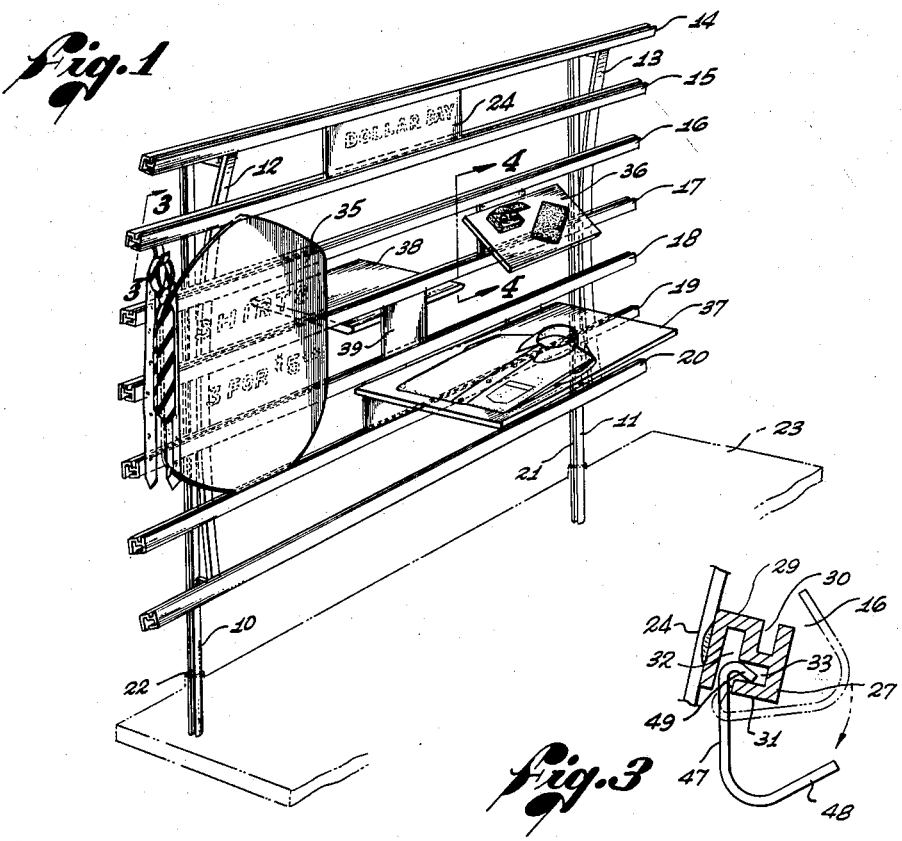
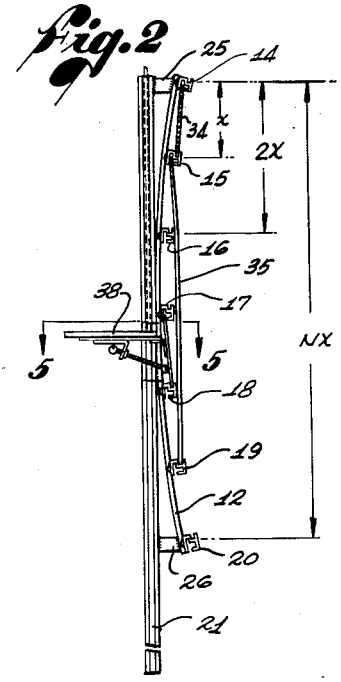
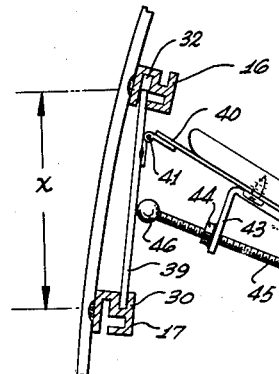
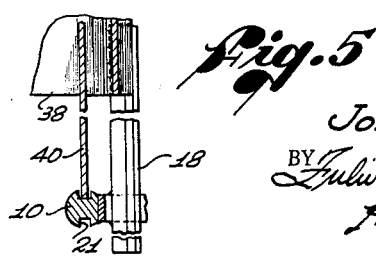
INVENTOR.
JOHN W. TOZIER

3,146,732
PROMOTIONAL DISPLAY FRAME
John W. Tozier, Montebello, Calif., assignor to Wolf & Vine, Inc., a corporation of California
Filed May 7, 1962, Ser. No. 192,750
5 Claims. (Cl. 108—9)

The present invention relates generally to display frames and, more particularly, to a promotional display frame for advertising or displaying articles to promote their sale.

An object of the invention is to provide a display frame that is adapted to receive a wide variety of modular sizes of advertising placards. In this connection, the display frame has the particular advantage of being limited, as to modular dimensions for the placards, in only one direction whereby a variety of abstract or free form as well as rectangular placards may be mounted in the frame.

Another object of the invention is to provide a display frame which supports shelves, advertising placards or other components on either side of the frame. The display frame further has the advantage of being adapted to mount components on one side of the frame without interfering with the use of modular sizes of placards or other components on the other side of the frame.

A still further object of the invention is to provide a display frame which receives both advertising placards and display shelves or other components, the mounting of all components being adaped for connection to the frame in such a manner as to not mar the exterior finish of the frame in any way whereby even after long use the frame will retain its original attractive finish.

The invention also has for an object the provision of component supporting bars cooperatively adapted to permit the attachment of component supporting brackets or advertising placards either from the ends of the bars or directly at any intermediate point along the length of the bars.

The foregoing and other objects and advantages of the invention will be apparent from the following description of a presently preferred embodiment thereof when taken on conjunction with the annexed drawings.

FIGURE 1 is a perspective view of a promotional display frame embodying the invention.

FIGURE 2 is an end elevational view of the frame shown in FIGURE 1, but with some of the shelves and supporting members removed in order to better illustrate the manner in which advertising placards are supported in the frame.

FIGURE 3 is a partial vertical sectional view taken on the line 3—3 of FIGURE 1.

FIGURE 4 is a partial vertical sectional view taken on the line 4—4 of FIGURE 1.

FIGURE 5 is a partial horizontal sectional view on the line 5—5 of FIGURE 2 to show the mounting of a placard on the back of the frame.

Referring to FIGURE 1, the display frame comprises a pair of uprights 10 and 11, a pair of verticaly extending straps 12 and 13, secured to the uprights, and a plurality of horizontally extending bars having opposite end portions secured to the front face of the straps. In the illustrated embodiment of the invention, all of the bars are of the same length and are made from the same cross-sectional configurations of extrusion, but, for convenience of reference, the bars are separately identified by the numerals 14–20 inclusive, from top to bottom.

It is particularly to be noted that the straps 12 and 13 are curved so as to provide concave front faces against which the bars 14–20 are mounted. Thus, the bars 14–20 present a convex-concave array. Also, the bars 14–20 are equally spaced apart to accommodate modular sizes of advertising placards. By way of example, a module of 3½ inches may be adopted for the basic vertical dimension of advertising placard to be held in the frame. Thus, in the illustrated display frame with seven horizontal bars, advertising cards, signs or placards may be cut to any shape and width as long as the vertical dimensions are multiples of the 3½ inch module, i.e., 3½ inch, 7 inch, 10½ inch, 14 inch, 17½ inch and 21 inch. With this modular spacing of and concave arrangement of the array of horizontal bars 14–20, placards having a modular height greater than one are accommodated by the frame without undue distortion of the placard.

More specifically, the uprights 10 and 11 each have the generally cylindrical configuration shown in FIGURE 5 but formed with an opposite pair of longitudinally extending grooves 21. The uprights may be mounted on a supporting surface in any desired fashion and in FIGURE 1 are illustrated as each being received in a complementarily shaped female socket 22, the pair of sockets in turn, being secured to a table 23. As is shown in FIGURE 1, the pair of uprights 10 and 11 are arranged to have a pair of the slots 21 facing or confronting one another.

Adjacent their opposite ends, each of the bars 14–20 is secured, as by spot welding 24 for example, to the concave faces of the straps 12 and 13. The straps 12 and 13, in turn, may be tack welded at their midportions to the front faces of the uprights 10 and 11. At opposite ends of the straps 12 and 13, a pair of spacer plates 25 and 26 may be fastened between the front face of the corresponding upright and the rear or convex face of the straps and this may also be conveniently accomplished by welding.

Each of the bars 14 through 20 has the cross-sectional configuration of the bar 16 shown in FIGURE 3. Each bar has an ungrooved front wall 27 and an ungrooved rear wall 28, but is formed with a top wall 29 interrupted or broken by an upwardly opening groove 30 disposed just behind the front wall 27. A lower wall 31 of the bar has its rear edge terminating short of the rear wall 28 to define a downwardly opening groove 32 just forwardly of the rear wall and having a branch 33 just above the lower wall 31, under the top groove 30.

A standard size of paper or cardboard sheet stock from which advertising placards are made is 22 x 28 inches, for which a base or module $x$ of 3½ inches may be adopted. Referring to FIGURE 1, the display frame is shown as supporting a placard 34 whose modular height is $x$ and another placard 35 whose modular height is $4x$. The frame also supports a small display shelf 36 and a larger display shelf 37 on the front side of the frame and another shelf 38 on the rear side of the frame. All of these shelves are supported on one or more rectangular mounting plates 39, each plate also having a modular height of $x$.

Referring to FIGURE 4, it will be seen that the clear span between an adjacent pair of horizontal bars, in this case the bars 16 and 17, is less than the module $x$ but that the spacing between the floor of the top groove 30 of the lower bar 17 and the floor of the downwardly opening groove 32 of the upper bar 16 exceeds the module $x$. With this arrangement, any component, for example in FIGURE 4, the plate 39, can be held on the frame with its upper end in the groove 32 and its lower end in an opposite groove 30. A component of the height $x$ can be mounted in place either by being inserted from the ends of the grooves 30 and 32 or by first inserting its upper edge into a groove 32 fully, then swinging the lower edge inwardly above a lower bar and then allowing the lower end of the component to be seated in a groove 30. The spacing between the floors of the grooves 30 and 32 can be such as to permit either or both methods of inserting a component. For greater flexibility, it is preferred that the horizontal bars be spaced apart sufficiently to provide enough clearance in the upper end of the groove 32 to permit the component to be inserted and moved upwardly sufficiently to allow the lower end of the component to clear the top surface of a lower horizontal bar into whose groove 30 it is desired to ultimately seat the component.

It will be observed that the placard 34 is rectangularly shaped while the placard 35 has an odd or abstract irregular shape. While a placard such as the placard 34, having a straight and long bottom edge and a relatively long surface along its upper edge in contact with a slot 32, will be securely held in place because of the great amount of bearing surface in contact with the bars, an irregularly shaped object such as the placard 35 has minimum areas in contact with the supporting bars. In some cases, as the case of a circular shape, the contact may amount to only substantially tangential contact at opposite upper and lower points. Therefore, irregularly shaped placards may be easily dislodged to fall out of a display rack or may be tipped so that the advertising message thereon will not be in the proper attitude.

For irregularly shaped placards having a height of greater than $x$, the convexity of the array of horizontal bars is such that a straight chord line cannot be drawn between confronting or oppositely facing grooves of a pair of bars spaced apart by two or more multiples of the base or module $x$. Thus, referring to FIGURE 2, a straight chord can be obviously drawn between the grooves 30 and 32 of an adjacent pair of bars and, also, between grooves of the most widely spaced pair of bars 14 and 20, but such a chord cannot be drawn between the grooves of any other pair of two bars without intersecting another bar disposed between the two bars between which such a chord line is drawn. For example it will be observed that the placard 35 mounted between the bars 15 and 19 is bent slightly where it passes over the bar 16. Thus, the placard 35, even if it were circular in shape and so having only substantial contact at upper and lower points, would nevertheless be contacted by an appreciable length of the bar 16 and slightly bent, as shown, and would so be held firmly in place and could not be dislodged or tilted from its proper position.

The shelves 36, 37 and 38 can be mounted at any level of the display frame. Since the adjacent pair of horizontal support bars in which the shelf is mounted may be horizontally offset and not vertically related, it is desirable to have an adjustment means to permit adjustment of the shelf into horizontal attitude if required, or to give any degree of desired angular adjustment. Thus, referring to FIGURE 1, the shelf 36 is adjusted to an angular position while the shelves 37 and 38 are shown in a level position. Whether or not a particular shelf is to be horizontal or inclined is, of course, determined by the choice of the display artist. For example, referring to FIGURE 4, it may be desired to move the shelf 36 to a horizontal position, rather than the inclined position illustrated, which would not be possible if the shelf 36 were fixed at right angular relationship to the plate 39.

To allow adjustability of the attitude of the shelves, each shelf, as for example the shelf 36 in FIGURE 4, has one or more plates or straps 40 secured to its underside and having a hinge connection as at 41 to the plate 39. An L-shaped strap 42 is also fastened to the underside of the shelf to have a downwardly extending leg 43 provided with a tapped boss 44 threadedly receiving an adjustment screw 45. At its opposite ends, the screw is provided with heads 46, one of which abuts the forward face of the plate 39. As is apparent, axial adjustment of the screw 45 permits angular adjustment, upwardly and downwardly, of the shelf 36 whereby the shelf may be mounted in horizontal attitude irrespective of the inclination of the plate 39 that is dictated by the amount of offset between adjacent horizontal support bars.

Articles may be hung on the display rack on hooks 47 such as are shown in FIGURE 3, which hooks are adapted to be inserted in a downwardly opening slot 32 and its branch 33 either from an end of one of the horizontal support bars or directly at any intermediate points between the ends of the bar. At one end, the hook 47 has a leg 48 spaced from an opposite end leg 49 a distance sufficient to allow the leg 49 to enter into the slot 32 when the hook is in the phantom outline position shown in FIGURE 3. Then the hook 47 can be turned clockwise from the phantom outline position to assume the solid outline position shown in FIGURE 3, and the leg 49 is sufficiently short to penetrate into the branch 33, and permit the hook to hang freely.

As is shown in FIGURE 2, shelves may be used on both sides of the display frame. Thus, the shelf 38 is supported on the frame to extend to the rear side of the frame, and this shelf may not only be used to support merchandise but can also serve the purpose of supporting another advertising placard which is viewable from the rear side of the frame. Such a placard is shown in FIGURE 5 wherein it will be observed that the opposite vertical edges of the placard 40 are retained in the grooves 21 of the uprights 10 and 11, the lower edge of the placard being supported on the shelf 38. In this connection, the uprights 10 and 11 are preferably spaced apart to define a modular distance between the floors of the grooves 21.

As is now apparent, any of the components thus far mentioned, and other types, may be supported in the display frame without any danger of marring the exposed surfaces of the horizontal parts. Thus, the components such as the placard 34, hook 47, or shelf bracket or plate 39 all have bearing contact with the horizontal support bars only in the grooves 30, 32 and 33 and do not come into contact with the exterior finish of the frame in any way.

While the embodiment herein shown and described in detail is fully capable of attaining the objects and providing the advantages hereinbefore stated, it is to be understood that it is merely illustrative of the invention and I do not mean to be limited to the details of the construction or design herein shown, but only by the spirit and scope of the following claims.

I claim:

1. A promotional display frame for releasably supporting a display component in an upright position comprising: at least three horizontally disposed elongated bars and means to support said bars both in parallel, equally vertically spaced apart relationship and in horizontally offset relationship to define a vertical convex-concave array of said bars, said bars having identical cross-sectional configurations, each of said bars having a longitudinally extending groove formed in an upper face of said bar and a longitudinally extending groove formed in the lower face of said bar whereby to receive upper and lower ends of a display component in the oppositely facing grooves of any pair of said bars with the upper end of said component received in the groove on the lower face of the upper one of said pair of bars and the lower end of the component received in the groove of the upper face of the lower one of said bars; and a display component comprising a shelf assembly adapted for mounting between any pair of adjacent ones of such bars, said assembly having a shelf and a bracket plate component on which said shelf is supported by a means to vary the angle included between said shelf and said bracket plate, said bracket plate having a height adapted for reception in the groove formed in the lower face of the upper one of said pair of adjacent bars and in the groove formed in the upper face of the lower one of said pair of adjacent bars, said shelf, on the under side thereof, mounting a means engageable with one face of said bracket plate adapted for adjusting the angular relationship of said shelf to said plate whereby to permit adjustment of said shelf to a level attitude irrespective of an inclination from the vertical of said bracket plate caused by the horizontally offset relative positions of said pair of adjacent horizontal bars.

2. A promotional display frame for receiving modular sizes of display placards, comprising a pair of horizontally spaced apart vertically extending members each having a vertically extending face that is vertically concave on a front side of said frame, a plurality of horizontally disposed elongated bars having opposite end portions secured to said concave faces of said vertically extending members, said bars being arranged in equally verticlly spaced apart parallel relationship and being horizontally offset from one another on said concave faces of said vertically extending members, all of said bars having identical cross-sectional configurations, each of said bars on the upper face thereof being formed with a longitudinally extending groove formed adjacent a front wall of said bar and each of said bars being formed on the lower face thereof with a longitudinally extending downwardly opening groove formed adjacent a rear wall of said bar, said upwardly opening and downwardly opening grooves of each bar having opposite ends opening into opposite ends of said bars, the vertical spacing between adjacent bars being less than a predetermined modular height of display placard and the vertical spacing between floors of the downwardly opening and upwardly opening grooves of adjacent bars being greater than said modular height whereby to receive upper and lower ends of a display placard in any pair of bars with the upper end of the placard in the downwardly opening groove of the upper one of said pair of bars and with the lower end of the placard received in the upwardly opening groove of the lower one of such pair of bars.

3. A display frame as set forth in claim 2 in which said vertically extending members are secured to a pair of vertically disposed generally cylindrical uprights, said uprights on confronting surfaces each being formed with a vertically extending slot opening into the upper end of said upright, said slots of said uprights being horizontally spaced apart a distance which is a multiple of the modular spacing between adjacent ones of said horizontally disposed bars.

4. A promotional display frame for receiving modular sizes of display placards, comprising a pair of vertically extending members, a plurality of horizontally disposed elongated bars having opposite end portions secured to faces of said vertically extending members, said bars being arranged in equally vertically spaced apart parallel relationship, all of said bars having identical cross-sectional configurations, each of said bars on the upper face thereof being formed with a longitudinally extending groove and each of said bars being formed on the lower face thereof with a longitudinally extending groove, the vertical spacing between adjacent bars being less than a predetermined modular height of display placard and the vertical spacing between floors of the downwardly opening and upwardly opening groove of adjacent bars being greater than said modular height whereby to receive upper and lower ends of a modular size of display placard in a pair of bars with the upper end of the placard in the downwardly opening groove of the upper one of said pair of bars and with the lower end of the placard received in the upwardly opening groove of the lower one of such pair of bars.

5. A promotional display frame for receiving modular sizes of display placards comprising at least three horizontally disposed elongated bars and means to support adjacent bars both in parallel equally vertically spaced apart relationship and in horizontally offset relationship to define a vertically convex-concave array of said bars, said bars having identical cross-sectional configurations, each of said bars having a longitudinally extending groove formed in an upper face of said bar and a longitudinally extending groove formed in the lower face of said bar, the vertical spacing between adjacent bars being less than a predetermined modular height of display placard and the vertical spacing between floors of the downwardly opening and upwardly opening grooves of adjacent bars being greater than said modular height whereby to receive upper and lower ends of a modular size of display placard in a pair of bars with the upper end of the placard in the downwardly opening groove of the upper one of said pair of bars and the lower end of the placard received in the upwardly opening groove of the lower one of such pair of bars.

References Cited in the file of this patent

UNITED STATES PATENTS

| 1,680,581 | Zangerle et al. | Aug. 14, 1928 |
| 1,880,828 | Countaney | Oct. 4, 1932 |
| 1,915,116 | Barrett | June 20, 1933 |
| 2,492,311 | Moro | Dec. 27, 1949 |
| 2,587,971 | Crawford | Mar. 4, 1952 |
| 2,690,136 | Freeman | Sept. 28, 1954 |
| 2,911,108 | Nield | Nov. 3, 1959 |
| 3,007,757 | Tillery | Nov. 7, 1961 |